United States Patent [19]

Uibel et al.

[11] 4,149,271

[45] Apr. 10, 1979

[54] SHAFT-MOUNTING ARRRANGEMENT FOR USE IN HOUSEHOLD MIXERS

[75] Inventors: Paul-Ulrich Uibel, Ennepetal; Miroslav Aigl, Wuppertal, both of Fed. Rep. of Germany

[73] Assignee: Vorwerk & Co Interholding GmbH, Wuppertal, Fed. Rep. of Germany

[21] Appl. No.: 857,769

[22] Filed: Dec. 5, 1977

[30] Foreign Application Priority Data

Dec. 6, 1976 [DE] Fed. Rep. of Germany ....... 7638118

[51] Int. Cl.² .............................................. B01F 7/16
[52] U.S. Cl. .................................. 366/314; 241/282.1
[58] Field of Search ............................. 366/205, 314; 241/199.12, 282.1, 282.2

[56] References Cited

U.S. PATENT DOCUMENTS

| | | | |
|---|---|---|---|
| 2,226,372 | 12/1940 | Cravaritis | 241/199.12 |
| 3,139,917 | 7/1964 | Elmore | 366/205 X |
| 3,172,441 | 3/1965 | Hartwig et al. | 366/205 X |
| 3,612,126 | 10/1971 | Emmons et al. | 366/205 X |

*Primary Examiner*—Philip R. Coe

*Attorney, Agent, or Firm*—Michael J. Striker

[57] ABSTRACT

A shaft-mounting arrangement for use in mixing containers of household mixers includes a carrier body which is mounted on the bottom wall of the mixing container and penetrates therethrough from the interior to the exterior of the container. The carrier body bounds a passage in which there is accommodated a friction bearing which, in turn, is mounted on the above-mentioned shaft. A respective cap is connected to and overlaps each of the end faces of the carrier body and has an aperture through which the shaft extends out of the passage. An annular lubricant-accumulating groove is bounded by the bearing and the carrier body at that end of the latter which is located within the container, and the associated cap has an offset region which is juxtaposed with the groove at a distance therefrom. The other cap has a lubricant-accumulating space therein, and a lubricant-permeable body is accommodated in the accumulating space and contacts the bearing at that end thereof which is located outside the container. Flow-directing disks are mounted on the shaft for joint rotation therewith, being located respectively adjacent the axial ends of the bearing.

10 Claims, 1 Drawing Figure

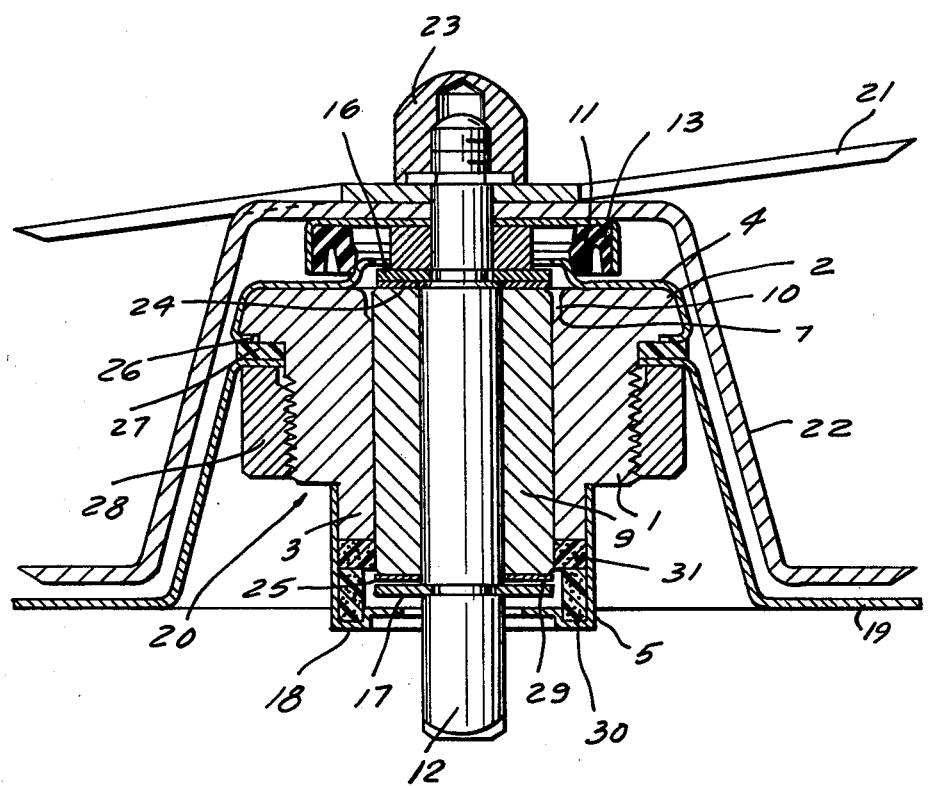

SHAFT-MOUNTING ARRRANGEMENT FOR USE IN HOUSEHOLD MIXERS

BACKGROUND OF THE INVENTION

The present invention relates to bearings in general, and more particularly to bearings to be used for mounting a blade-supporting shaft on the bottom wall of a mixing container of a household mixer.

There are already known various constructions of mounting arrangements of this type, among them such which utilize a friction bearing which is accommodated in a sleeve-shaped carrier body or portion rigid with the bottom wall of the mixing container and bounding a passage which communicates the interior of the mixing container with the exterior thereof at the bottom wall.

It is well known that most friction bearings must be lubricated, usually by oil, so as to reduce the frictional resistance between the two mutually displaceable contact surfaces of the shaft, on the one hand, and of the friction bearing, on the other hand, to thereby avoid seizing of the shaft in the bearing and/or rapid deterioration of the bearing due to wear thereof. Thus, it has been already previously proposed to use oil-lubricated bearings in the above environment. However, experience has shown that the prior-art mounting arrangements utilizing lubricated friction bearings are prone to lose, within a shorter or a longer period of time, depending on the particular construction of the mounting arrangement, the supply of lubricating oil or, in other words, run dry. It will be appreciated that, when this happens, the now unlubricated bearing will deteriorate rather rapidly, requiring an expensive replacement thereof or even the purchase of a replacement mixing container or even of the entire mixer. This, of course, is very disadvantageous.

In one of the proposed constructions of the mounting arrangement of this type, which has been disclosed in the German published patent application DT-AS 1 008 058 two cylindrical friction bearings are arranged in a carrier body, each at one exial end thereof. Then, a lubricant-receiving space is obtained between the two friction bearings which are axially spaced from one another. A closable duct, which is filled with a lubricant, penetrates through the housing of the mounting arrangement and communicates with the lubricant-receiving space. As a result of this construction, it is possible to replenish the supply of the lubricant in the lubricant-receiving space through the above-mentioned channel and thus supply the lubricant to the two bearings to be lubricated. However, some of the lubricant will escape from the lubricant-receiving space past the bearings and out of the carrier body, the escaping amount of the lubricant being lost. Thus, this particular mounting arrangement is disadvantageous in two respects. First of all, it is a drawback of this arrangement that the proper amount of the lubricant within the carrier body can be maintained only by replenishing the supply of the lubricant in the lubricant-receiving space from time to time. On the other hand, it is also disadvantageous that the escaping lubricant can come into contact with the contents of the mixing container and contaminate the same if not render it useless altogether.

SUMMARY OF THE INVENTION

Accordingly, it is a general object of the present invention to avoid the disadvantages of the prior art.

More particularly, it is an object of the present invention to provide an arrangement for mounting a rotary shaft in a bottom wall of a container, particularly a mixing container of a household mixer, which is not possessed of the above-discussed disadvantages of similar prior-art arrangements of this type.

Still another object of the present invention is to so construct the mounting arrangement that the lubricant for the friction bearing thereof will be recirculated within the mounting arrangement rather than escaping to the exterior thereof. A yet another object of the present invention is to develop a mounting arrangement of the above-mentioned type which will avoid the contact of the lubricant with the contents of the mixing container during the use of the household mixer.

A concomitant object of the present invention is to so design the mounting arrangement as to be simple in construction, inexpensive to manufacture, and reliable nevertheless.

In pursuance of these objects and others which will become apparent hereinafter, one feature of the present invention resides, briefly stated, in an arrangement for mounting a blade-carrying shaft at a bottom wall of a detachable mixing container of a household mixer, which comprises an elongated carrier body having longitudinally spaced end faces and an internal surface which bounds a passage extending between and opening onto the end faces, the carrier body being rigid with the bottom wall of the container and penetrating therethrough so that one of the end faces is located interiorly and the other of the end faces exteriorly of the container; a friction bearing accommodated in the passage of the carrier body and surrounding the blade-carrying shaft, the bearing having an external surface which faces the internal surface of the carrier body and bounds therewith an annular groove at the one end face of the carrier body; and two covering caps respectively overlapping and connected to the end faces of the carrier body and having respective apertures through which the blade-carrying shaft passes out of the passage. It is particularly advantageous when the bottom wall of the container has an opening therein and the carrier body is a discrete element separate from the container and received in the opening of the bottom wall of the container, the carrier body being dismountably connected to the bottom wall of the container, advantageously by providing the carrier body with an annular collar which abuts the bottom wall of the container around the opening thereof, and by using a threaded connector engaging the carrier body to urge the annular collar of the carrier body into abutment with the bottom wall of the container.

According to a further, currently preferred, concept of the present invention, that one of the covering caps which is connected to the end face of the carrier body which is located within the container has an offset portion juxtaposed with the groove at a distance therefrom. In this context, it is further advantageous when the blade-carrying shaft is formed with a sealing portion which circumferentially surrounds the offset portion of the above-mentioned covering cap, and when a circumferentially complete annular sealing member is interposed between the offset portion of the covering cap and the sealing portion of the blade-carrying shaft.

In order to be able to circulate the lubricant which escapes out of the bearing, within the passage of the carrier body, two flow-directing members, especially circumferentially complete disks, are provided each of which is juxtaposed with one axial face of the bearing. In this context, it is further advantageous when each of the flow-directing disks is connected to the blade-carrying shaft for joint rotation therewith.

According to a further advantageous, currently preferred, aspect of the present invention, that covering cap which is located at the exterior of the container bounds an annular lubricant-accumulating space about and spaced from the blade-carrying shaft. The, it is advantageous to accommodate at least one lubricant-permeable body in the lubricant-accumulating space and to have it contact the bearing at the exteriorly located end of the carrier body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing is a cross-sectional view of the mounting arrangement of the present invention as mounted at the bottom wall of a mixing container for a household mixer.

DETAILED DISCUSSION OF THE PREFERRED EMBODIMENT

Coming now to the drawing in detail, it may be seen that the sole FIGURE thereof illustrates a sectional view through a fragmentarily shown bottom wall 19 of a mixing container for a household mixer, the bottom wall 19 having mounted thereon a mounting arrangement designated in toto with the reference numeral 20. The mounting arrangement 20 includes a carrier body 1 and a frictional bearing 9 which may be, to advantage, of a cylindrical configuration. A blade-carrying shaft 12 is surrounded by and supported on the bearing 9.

The carrier body 1 is generally sleeve-shaped and elongated and has longitudinally spaced end faces 2 and 3. Covering caps 4 and 5 are connected to the carrier body 1 at the respective end faces 2 and 3 thereof, such as by being extruded thereon or being bent therearound. The covering cap 4 is so configured that it recedes upwardly from the end face 2 of the carrier body 1 in the central region thereof.

Furthermore, two beating blades 21, 22 are mounted on the blade-carrying shaft 12, being connected to the shaft 12 for joint rotation therewith by a cup-shaped nut 23. Moreover, a rotating disk 16 is mounted on the blade-carrying shaft 12, and a washer 24 is interposed between the disk 16 and the associated end face of the bearing 9. The washer 24 avoids direct contact of the disk 16 with the cylindrical friction bearing 9 so that the disk 16 is prevented from digging into or otherwise wearing off the material of the friction bearing 9. Another disk 17 is mounted on the shaft 12 at the other axial side of the bearing 9, and another washer 25 is interposed between the disk 17 which rotates with the shaft 12 and the stationary associated end face of the bearing 9, the washer 25 having the same function as the washer 24.

The carrier body 1 of the mounting arrangement 20 has an annular collar 26 at the outer periphery thereof, the collar 26 resting on the bottom 19 of the mixing container. An annular sealing element 27, preferably of rubber, is interposed between the collar 26 and the bottom 19 of the mixing container. An annular nut 28 threadingly engages the carrier body 1 of the assembled mounting arrangement 20 and acts on the carrier body 1 in such a sense as to press the collar 26 against the bottom wall 19.

Now, when the blade-carrying shaft 12 is set in rotation, lubricant, usually oil for lubricating the friction bearing 9, escapes from the cylindrical friction bearing 9 and seeps upwardly at the interface of the bearing 9 with the blade-carrying shaft 12. When this happens, the rotating disk 16 entrains such seepage lubricant and throws the same radially upwardly. This is rendered possible by the fact that a certain play 29 is present between the bearing 9 and the disks 16 and 17 and that the blade-carrying shaft 12 conducts axial movements during the operation of the mixer. Thus, the seepage oil can flow between the rotating disk 16 and the washer 24 so that the disk 16 acts as a flow-directing element. The outwardly proceeding oil impinges against a raised portion 11 of the covering cap 4 and descends onto an annular bulge 7 which defines, together with the friction bearing 9, a circumferentially complete groove 10. The oil accumulating in the groove 10 is then again sucked into the cylindrical friction bearing 9 and thus recirculated to the point of use.

Furthermore, a circumferentially complete annular sealing member 13 is provided, which is mounted on the shaft 12 and contacts the raised portion 11 of the covering cap 4. This sealing member 13 prevents the lubricant from escaping into the mixing container and from contaminating the contents of such container. On the other hand, the sealing member 13 also presents the contents of the container from penetrating into the mounting arrangement 20.

Simultaneously therewith, the lubricant escapes from the cylindrical friction bearing 9 at the washer 25 during the rotation of the blade-carrying shaft 12. Similarly to what has been described above, the lubricant is entrained by the rotating disk 17 and propelled radially outwardly until it impinges a so-called lubricant-return ring 30 which is made of a lubricant-permeable material, such as felt. The ring 30 accepts the lubricant and conducts the same to a so-called reserve ring 31 which again is made of a lubricant-permeable material, the ring 31 conducting the lubricant back to the cylindrical friction bearing 9.

The covering cap 5 is so configured that it bounds a so-called lubricant-accumulating space 18. The lubricant-return ring 30 is then accommodated in the lubricant-accumulating space 18. In this way, it is achieved in a particularly simple manner that the lubricant, such as oil, which escapes from the cylindrical friction bearing 9 either upwardly or downwardly is recirculated back to the cylindrical friction bearing 9. In this connection, it is to be mentioned that no felt rings are needed at the upper end face 2 of the carrier body 1 inasmuch as the oil or a similar lubricant is brought back to the cylindrical friction bearing 9 through the circumferentially complete groove 10.

It will be understood that each of the elements described above, or two or more together, may also find a useful application in other types of constructions differing from the types described above.

While the invention has been illustrated and described as embodied in a mounting arrangement for use in a mixing container of a household mixer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement, particularly for a household mixer, comprising a detachable mixing container of the household mixer, and having a bottom wall provided for mounting thereon a blade-carrying shaft, an elongated carrier body having longitudinally spaced end faces, a passage bounded by an internal surface and extending between and opening into said end faces, said carrier body being rigid with the bottom wall of the container and penetrating therethrough so that one of said end faces is located interiorly and the other of said end faces exteriorly of the container; a friction bearing accommodated in said passage of said carrier body and surrounding the blade-carrying shaft, said bearing having an external surface which faces said internal surface of said carrier body and bounds therewith an annular groove at said one end face of said carrier body; and two covering caps respectively overlapping and connected to said end faces of said carrier body and having respective apertures through which the blade-carrying shaft passes out of said passage.

2. An arrangement as defined in claim 11, wherein that one of said covering caps which is connected to said one end face of said carrier body has an offset portion juxtaposed with said groove at a distance therefrom.

3. An arrangement as defined in claim 2, wherein the blade-carrying shaft has a sealing portion which circumferentially surrounds said offset portion of said one covering cap; and further comprising a circumferentially complete annular sealing member interposed between said offset portion of said one covering cap and said sealing portion of the blade-carrying shaft.

4. An arrangement as defined in claim 11, wherein said bearing has axial faces at said end faces of said carrier body; and further comprising two flow-directing members each juxtaposed with one of said axial faces of said bearing.

5. An arrangement as defined in claim 4, wherein each of said flow-directing members is a circumferentially complete disk.

6. An arrangement as defined in claim 1, wherein each of said flow-directing members is connected to the blade-carrying shaft for joint rotation therewith.

7. An arrangement as defined in claim 1, wherein that one of said covering caps which is connected to said other end face of said carrier body bounds an annular lubricant-accumulating space.

8. An arrangement as defined in claim 7; and further comprising at least one lubricant-permeable body accommodated in said lubricant-accumulating space and contacting said bearing at said other end face of said carrier body.

9. An arrangement as defined in claim 1, wherein the bottom wall of the container has an opening therein; wherein said carrier body is a discrete element separate from the container and received in the opening of the bottom wall of the container; and further comprising means for dismountably connecting said carrier body to the bottom wall of the container.

10. An arrangement as defined in claim 9, wherein said connecting means includes an annular collar of said carrier body which abuts the bottom wall of the container around the opening thereof, and a threaded connector which engages said carrier body and urges said annular collar thereof into abutment with the bottom wall of the container.

* * * * *